July 22, 1958 — V. S. RHEELING — 2,843,954
GUARD
Filed April 25, 1956 — 2 Sheets-Sheet 1
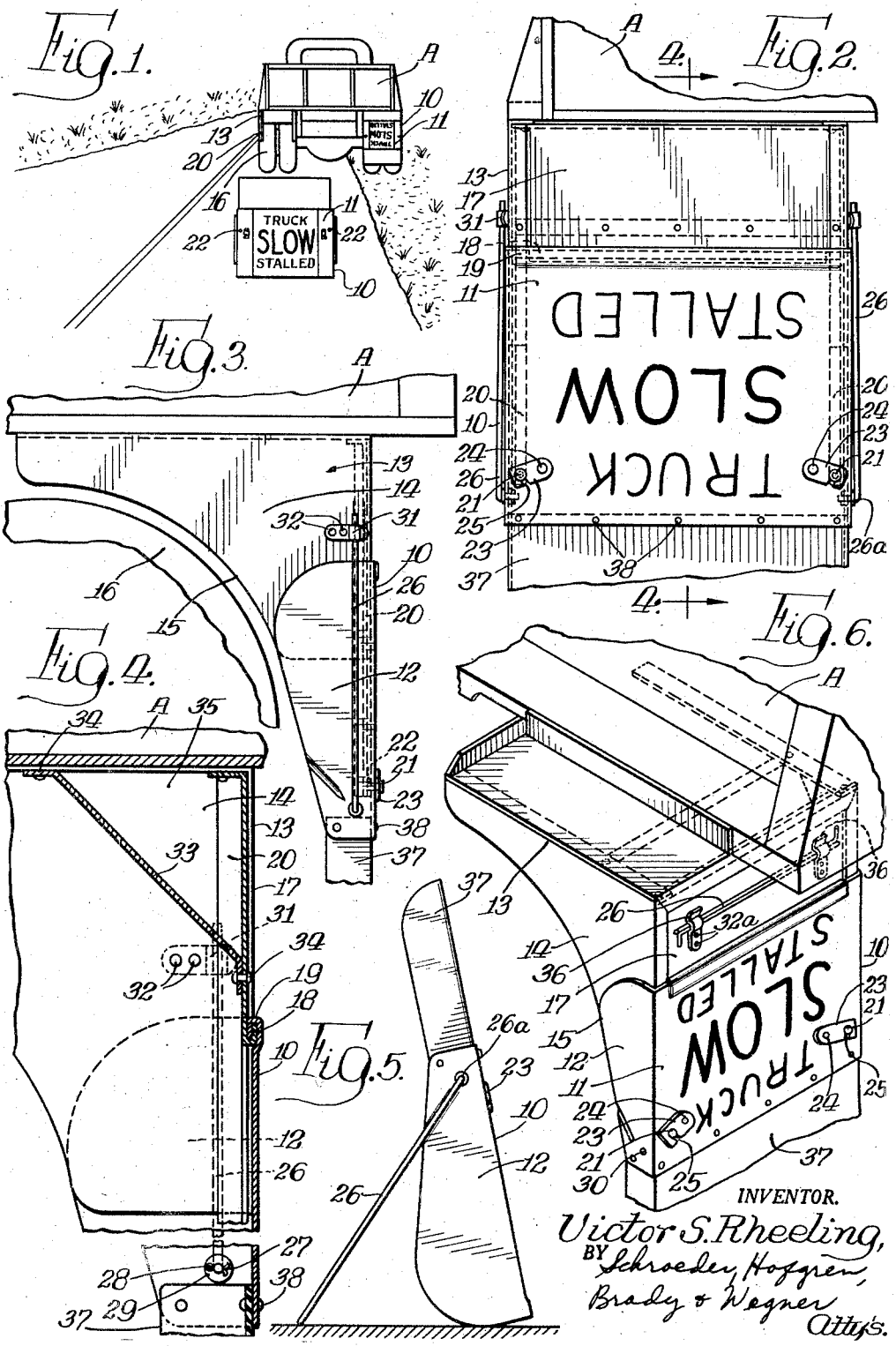
INVENTOR.
Victor S. Rheeling,
BY Schroeder, Hofgren,
Brady & Wegner
Attys.

July 22, 1958 V. S. RHEELING 2,843,954
GUARD
Filed April 25, 1956 2 Sheets-Sheet 2
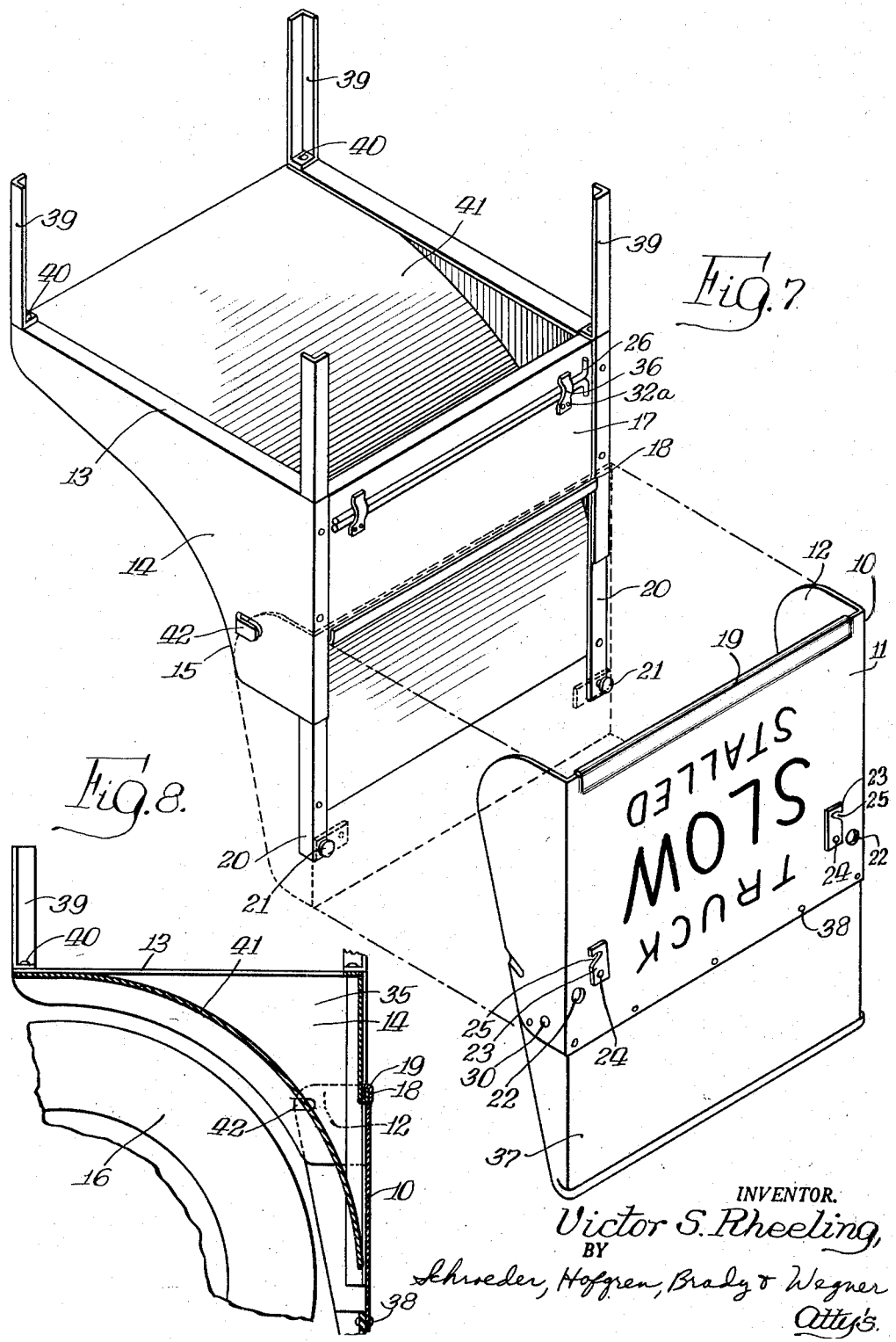
INVENTOR.
Victor S. Rheeling,
BY
Schroeder, Hofgren, Brady & Wegner
Atty's.

United States Patent Office 2,843,954
Patented July 22, 1958

2,843,954

GUARD

Victor S. Rheeling, Rock Falls, Ill., assignor to Victor S. Rheeling and Harold Berg, copartners, doing business as Rheeling Safety Splash Guard Co.

Application April 25, 1956, Serial No. 580,587

4 Claims. (Cl. 40—129)

This invention relates to a dual purpose wheel guard for vehicle bodies and more particularly to a dual purpose splash guard for the rear wheels of large motor vehicles having overhanging bodies, such as trucks.

Vehicles currently in use on the highways, and particularly large trucks and the like, tend to throw mud, stones and the like to the side and to the rear of the rear wheels as these vehicles move along. This flying material often blinds passing drivers by striking their windshields and sometimes causes serious accidents.

The necessity for warning signs to be used in conjunction with stopped or stalled vehicles on the highway to warn approaching motorists is also well known. One of the advantages of the improved dual purpose wheel guard of this invention is to provide a remedy for these two problems in one simple structure. The wheel guard of this invention is so constructed as to almost entirely prevent mud, stones and the like from being thrown either to the side or to the rear of the moving vehicle. Furthermore, when the vehicle is stopped or stalled on the highway, the guard may be removed and used as a warning sign for approaching motorists.

Another advantage of this invention lies in its substantially rigid yet detachable mounting on a vehicle body. Because of this mounting there is substantially no vibration or rattling present while the vehicle is in motion. Yet though the guard is substantially rigidly mounted on the vehicle body, it is capable of being readily removed for use as a warning sign. Further, in the case of large motor vehicles which are used to deposit their contents by dumping, such as dump trucks, the guards may be easily removed so as not to interfere with dumping operations. A further advantage of this construction provides means preventing substantial clogging of the guard with residual mud or dirt.

Other objects and advantages will become apparent from a consideration of the following detailed description taken in connection with the accompanying drawings, of which:

Fig. 1 is a perspective view showing the guard in use both as a sign and as a mud guard;

Fig. 2 is a front elevational view;

Fig. 3 is a side elevational view;

Fig. 4 is a fragmentary vertical sectional view taken substantially along the lines 4—4 of Fig. 2;

Fig. 5 is a side elevational view of the sign portion of the guard in use as a sign;

Fig. 6 is a perspective view showing another embodiment of the guard for use with dump trucks;

Fig. 7 is a perspective view showing a further embodiment of the guard; and

Fig. 8 is a fragmentary side elevational view of the embodiment shown in Fig. 7.

The wheel guard of this invention comprises a frame 10 which includes an end panel 11 and side panels 12. On the end panel 11 is exhibited a warning sign made from a reflective type material. The frame member of this invention is substantially rigidly and removably attached to the vehicle body A by means of a bracket 13 which is attached to the vehicle body A by means of welding, riveting or the like. The bracket member 13 contains an end panel 17, the lower edge of which is bent into a U-shaped trough 18. The frame member 10 is attached to the bracket member. The top edge of the frame member 10 is also bent into a U-shaped trough 19 which cooperates with the trough 18 to make a tight fitting attachment. The bracket member 13 also includes two arms 20 which extend downward. Near the end of these arms 20 are located two studs 21, which are arranged so as to pass through two holes 22 in the frame member 10. A latch 23 is positioned rotatively by rivets 24 adjacent the hole 22. The latch 23 is provided with a cut-out portion 25 which is arranged to accept the stud 21. Thus when the stud 21 passes through the hole 22 it may be locked by the latch 23, giving a rigid mounting to the frame member 10. The bracket 13 also includes sides 14, which are arranged so as to cooperate with the sides 12 of the frame member 10, thus making a continuous side with an arcuate base as shown at 15, thus allowing the removal of the tires 16 as necessary.

The frame member 10 is also provided with brace rods 26 which are rotatively positioned in the frame member 10 at 27 by means of a cotter key 28 and washer 29. The end of the rod 26 is bent at 26a so as to allow insertion through the frame hole 30 and drilled to permit the entrance of the cotter key 28. When the frame member 10 is attached to the bracket 13, the brace rod 26 is held in an upright position by clips 31 which are held to the side of the bracket member as shown in Fig. 4 by rivets 32. Thus, the brace rods 26 may be removed and positioned as shown in Fig. 5 when the frame member is being used as a warning sign. The bracket member also includes a baffle plate 33 which is positioned across the outermost corner of the bracket member 13 by rivets 34 as shown in Fig. 4. This baffle plate prevents mud, dirt and the like from becoming clogged in the corner of the frame member at 35.

Fig. 6 shows another embodiment of the wheel guard which is more suitable for use with dump trucks and the like. Because with a dump truck it is necessary to remove the frame member before the dumping operation may be started, the brace rods 26 are located on the end panel 17 of the bracket member 13. A similar type of clip 36 is used to position the rods, the clip being riveted 32a as the clip 31.

Figs. 7 and 8 show a further embodiment of the wheel guard which complies in construction to the regulations of certain of the several states. Thus, the extensions 39 are attached to the bracket member 13 by means of rivets, screws or the like 40. These extensions may be of any desired length and allow the guard to be positioned relative to the wheel 16 by welding or attaching the upper end of the extension to the body A. Thus the guard may be raised or lowered, as is necessary, to more effectively prevent mud, stones and the like from being thrown by the wheel.

Also, there is an inside, curved contour pan 41 which performs a similar function to that of the baffle plate 33 in that it prevents mud, dirt and the like from becoming clogged in the corner of the frame member at 35. Embossed clips 42 are attached by means of welding, riveting and the like to the bracket side 14 and are arranged to receive the side 12 so as to hold the side rigid and to prevent flaring out under high velocity wind conditions.

A rubber skirt 37 is provided on the bottom of the frame member 10 and is attached by means of studs or rivets, as shown in Fig. 2 at 38. This rubber skirt also helps to prevent mud and dirt from being thrown toward the rear of the moving vehicle, yet will not be bent or torn by normal contact with stationary objects as when backing the truck to a loading platform or the like.

Having thus described my invention as related to the embodiments shown in the accompanying drawings, it is my intention that the invention be not limited by any of the details of description unless otherwise specified, but rather be construed broadly within its spirit and scope as set out in the accompanying claims.

I claim:

1. A dual purpose warning sign and wheel guard for vehicle bodies comprising: a bracket member including an end panel and side panels; means for positioning said bracket member generally rearwardly of said wheel and in relatively close proximity to the upper periphery of said wheel; a frame member including an end sign panel and side panels adapted to be placed on said bracket member, said frame member end panel and side panels arranged to cooperate with said bracket member end panel and side panels to provide a continuous relatively impervious guarding surface about the rear upper periphery and sides of said wheel; substantially unyielding rigid means removably attaching said frame member to said bracket member at one area on said frame member; substantially unyielding rigid means removably attaching said frame member to said bracket member at a second area on said frame member that is spaced from said one area; and a collapsible brace means attached to said frame member for supporting the frame substantially erect when it is removed from said body for use as a warning sign.

2. A dual purpose warning sign and wheel guard for vehicle bodies comprising: a bracket member including an end panel and side panels; means including a plurality of upwardly extending rods for positioning said bracket member generally rearwardly of said wheel and in relatively close proximity to the upper periphery of said wheel; a frame member including an end sign panel and side panels adapted to be placed on said bracket member, said frame member end panel and side panels arranged to cooperate with said bracket member end panel and side panels to provide a continuous relatively impervious guarding surface about the upper rear periphery and sides of said wheel; substantially unyielding rigid means removably attaching said frame member to said bracket member at one area on said frame member; substantially unyielding rigid means removably attaching said frame member to said bracket member at a second area on said frame member that is spaced from said one area; and a collapsible brace means attached to said frame member for supporting the frame substantially erect when it is removed from said body for use as a warning sign.

3. A dual purpose warning sign and wheel guard for vehicle bodies comprising: a bracket member including an end panel and side panels; means including a plurality of upwardly extending rods for positioning said bracket member generally rearwardly of said wheel and in relatively close proximity to the upper periphery of said wheel; a frame member including an end sign panel and side panels adapted to be placed on said bracket member, said frame member end panel and side panels arranged to cooperate with said bracket member end panel and side panels to provide a continuous relatively impervious guarding surface about the upper rear periphery and sides of said wheel; substantially unyielding rigid means removably attaching said frame member to said bracket member including a U-shaped trough on said bracket member and a corresponding cooperating U on said frame member; substantially unyielding rigid means removably attaching said frame member to said bracket member including a stud on said bracket member adapted to be lockably received by said frame member, said stud being spaced from said troughs; and a collapsible brace means attached to said frame member for supporting the frame substantially erect when it is removed from said body for use as a warning sign.

4. A dual purpose warning sign and wheel guard for vehicle bodies comprising: a bracket member including an end panel and side panels; means including a plurality of upwardly extending rods for positioning said bracket member generally rearwardly of said wheel and in relatively close proximity to the upper periphery of said wheel; a frame member including an end sign panel and side panels adapted to be placed on said bracket member, said frame member end panel and side panels arranged to cooperate with said bracket member end panel and side panels to provide a continuous relatively impervious guarding surface about the upper rear periphery and sides of said wheel; substantially unyielding rigid means removably attaching said frame member to said bracket member including a U-shaped trough on said bracket member and a corresponding cooperating U on said frame member; substantially unyielding rigid means removably attaching said frame member to said bracket member including a stud on said bracket member adapted to be lockably received by said frame member, said stud being spaced from said troughs; and collapsible brace rods attached to said frame member for supporting the frame substantially erect when it is removed from said body for use as a warning sign.

References Cited in the file of this patent

UNITED STATES PATENTS

| | | |
|---|---|---|
| 2,235,530 | Mercer | Mar. 18, 1941 |
| 2,546,781 | Rheeling | Mar. 27, 1951 |
| 2,591,196 | Post | Apr. 1, 1952 |
| 2,758,401 | Wilson | Aug. 14, 1956 |